United States Patent [19]

Lee et al.

[11] Patent Number: 5,571,869
[45] Date of Patent: Nov. 5, 1996

[54] FLAME INITIATED GRAFT POLYMERIZATION

[75] Inventors: Sunggyu Lee, Akron, Ohio; Ramesh Rengarajan, Singapore, Singapore

[73] Assignee: The University of Akron, Akron, Ohio

[21] Appl. No.: 428,562

[22] Filed: Apr. 25, 1995

[51] Int. Cl.$^6$ .................. C08F 255/00; C08F 257/02; C08F 265/10; C08F 265/04; C08F 265/06; C08F 265/08; C08F 283/02; C08F 279/02; C08F 265/10; C08F 261/04; C08F 259/04; C08F 263/04

[52] U.S. Cl. .................. 525/322; 525/312; 525/302; 525/301; 525/309; 525/310; 525/285; 525/315; 525/313; 525/289; 525/290; 525/297; 525/296; 525/319; 525/317; 525/461; 525/445; 525/426; 525/455; 525/59

[58] Field of Search .................. 525/312, 302, 525/301, 309, 310, 285, 315, 313, 289, 290, 297, 296, 319, 317, 461, 445, 426, 455, 59, 322

[56] References Cited

U.S. PATENT DOCUMENTS

| | | |
|---|---|---|
| 2,991,269 | 7/1961 | Nozaki . |
| 3,565,780 | 2/1971 | Zimmerman . |
| 3,798,555 | 1/1973 | Gaylord . |
| 4,211,622 | 7/1980 | Nablo . |
| 4,278,777 | 7/1981 | Jakabhazy et al. . |
| 4,440,916 | 4/1984 | Waters et al. . |
| 5,079,302 | 1/1992 | Lee et al. . |

*Primary Examiner*—Vasu S. Jagannathan
*Attorney, Agent, or Firm*—Renner, Kenner, Greive, Bobak, Taylor & Weber

[57] ABSTRACT

Grafted polymer particles are prepared by a free-radical addition polymerization mechanism using a flame produced by igniting a mixture of a combustible gas and an oxidant to heat at least a portion of the surface of a solid polymer particle to produce free-radicals thereon. At least one polymerizable ethylenically unsaturated monomer is contacted and reacted with the free-radicals formed on the surface of the polymer to form a graft thereon.

14 Claims, 1 Drawing Sheet

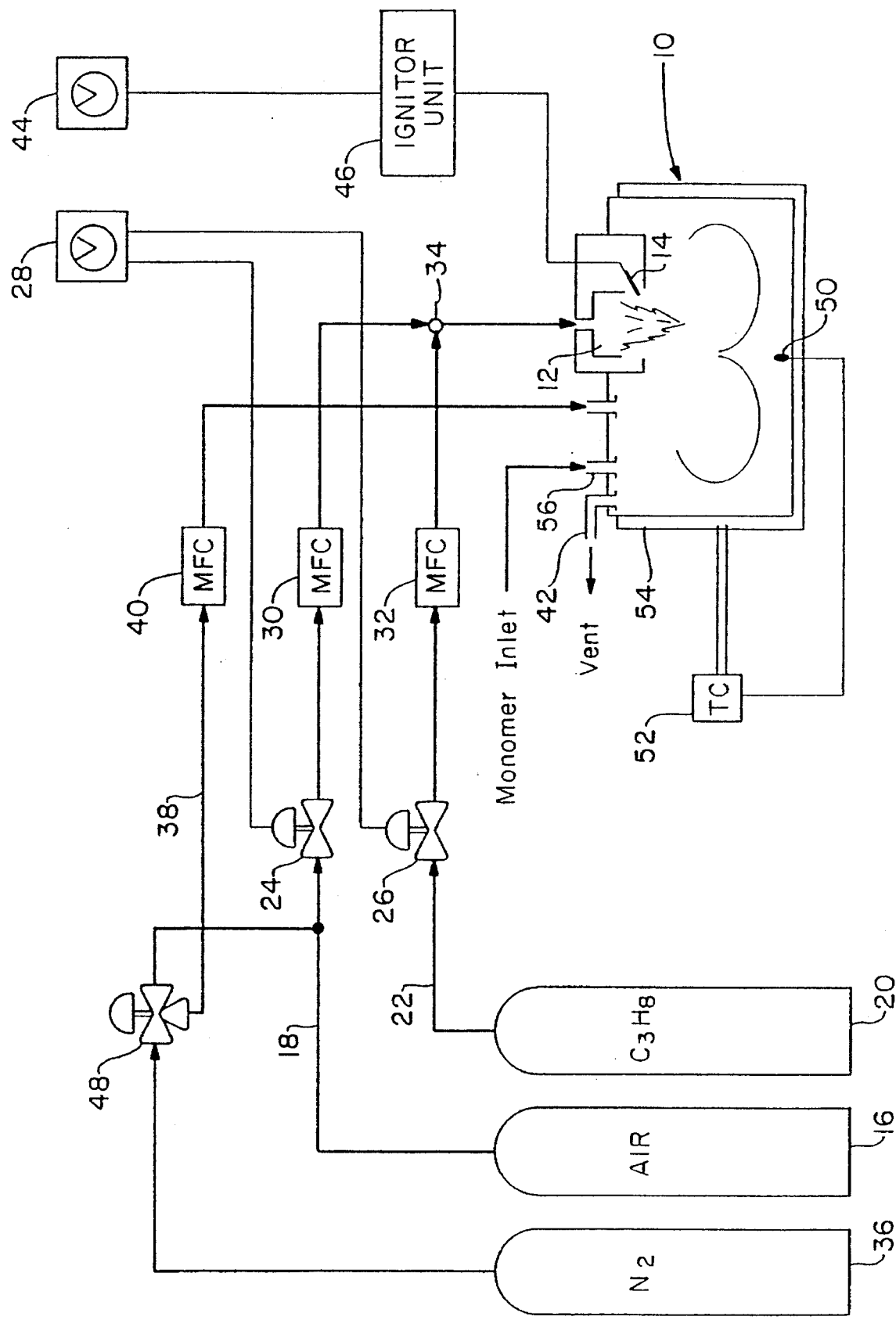

FLAME INITIATED GRAFT POLYMERIZATION

FIELD OF THE INVENTION

The invention generally relates to graft copolymers, and more particularly to a method and product of grafting ethylenically unsaturated monomers to a polymer particle by free-radically initiated addition polymerization. More specifically, the invention pertains to a solid phase, free-radical flame grafting polymerization process and to graft copolymers thereof.

BACKGROUND OF THE INVENTION

Heretofore, existing techniques for grafting monomers to existing polymers or polymer particles generally related to solution processes, mechanical agitation at cryogenic temperatures, the addition of monomers to a molten or fluid polymer, the use of irradiation, and the like. An inherent drawback of some of these processes was that they tended to degrade the polymer.

SUMMARY OF THE INVENTION

The present invention relates to a solid-phase reaction of polymer particles with ethylenically unsaturated monomers to form grafted chains substantially in the absence of both free-radical initiators and solvents, and without the need for irradiation equipment. Also provided are novel grafted copolymer particles having enhanced properties which are prepared in accordance with the solid-phase graft copolymerization process disclosed herein.

The present invention can be utilized to chemically modify a variety of polymers in the form of particles by grafting ethylenically unsaturated monomers thereon to impart improved surface characteristics relating to compatibility or miscibility with other polymers, to form composites having enhanced mechanical properties, to provide improved thermal stability, improved anti-static or static dissipative properties, and to provide improved weatherability.

The invention relates to the generation of free-radical sites on the surface of a solid polymer particle by flame initiation, and the chemical bonding of ethylenically unsaturated monomers to the free-radical sites via a free-radical addition polymerization reaction mechanism which is carried out at relatively moderate temperatures and pressures.

BRIEF DESCRIPTION OF THE DRAWINGS

FIG. 1 is a schematic diagram showing an apparatus suitable for practicing the process of the invention.

DESCRIPTION OF THE PREFERRED EMBODIMENTS

The flame initiated graft copolymerization of the present invention comprises subjecting a solid polymer to an impinging flame to cause localized heating or miniature hot spots on the polymer surface to create free-radical sites which react with one or more ethylenically unsaturated monomers and thereby form a graft copolymer wherein the graft chain is comprised of one or more repeat units of said ethylenically unsaturated monomers.

Suitable solid polymers which can be used in the graft copolymerizable process include any of various hydrocarbon based polymers which are amenable to free-radical generation by flame impingement. Such polymers generally include natural or synthetic organic polymers having carbon-carbon single or double bonds. The solid polymer can be crystalline or amorphous, atactic, isotactic, syndiotactic, and can be a homopolymer, a copolymer, or can be comprised of generally any number of different monomers. Solid heteropolymers can be of the random or block type. The solid polymers can be linear, branched or starred, thermoplastic, elastomeric, thermosetting, crosslinked or non-crosslinked. The number or weight average molecular weight of the solid polymer is not critical and may generally range from two or three thousand up to 10 million or more. Exemplary polymers include polyolefins such as polyethylene, e.g., high density polyethylene (preferred) and polypropylene (preferred); polymers of vinyl substituted aromatics, e.g., polystyrene; polyvinyl chlorides; polyacrylamides; poly(meth) acrylates; polyacrylonitriles (preferred); polycarbonates (preferred); polydienes; polyesters; polyimides; polyvinyl esters such as polyvinyl acetate; polyvinyl alcohols; polyurethanes, and the like, as well as various heteropolymers comprised of the monomeric units contained in the foregoing list of homopolymers.

The solid polymers onto the surface of which the ethylenically unsaturated addition monomers are grafted are preferably in particulate powder, granular, flake or other comminuted form. The solid particles are preferably free flowing under reaction conditions and can be either approximately spherical or can be irregularly shaped. The average particle diameter is desirably less than about 10 or 20 millimeters and more preferably is in the range from about 0.1 to about 5 millimeters. Smaller particle sizes are generally preferred due to better flow properties and larger surface area.

Ethylenically unsaturated monomers which can be used in the practice of the invention generally include any monomer having a carbon-carbon double bond which can be polymerized by free-radical addition. While the invention is applicable to generally any free-radical addition polymerizable monomer, it is most preferably used in association with monomers which are capable of imparting improved properties to the solid phase polymer. Desirably, the unsaturated monomer is different than the polymer particle, although, if desired, it can be the same. Exemplary ethylenically unsaturated monomers for use with the invention include various olefins such as ethylene, propylene, butylene, pentylene and similar linear α-olefins such as isobutylene, isopentylene and other similar iso-olefins, polyalkylated olefins having from 2 to 20 carbon atoms such as 2-butene, 3-pentene, 2-pentene, trimethylethylene, tetra-methylethylene, and other similar polyalkylated olefins, olefins such as cyclic olefins having from 5 to 20 carbon atoms such as cyclopentene, cyclohexene, cyclooctene, and other similar cyclic olefins, olefins such as halogenated and polyhalogenated olefins having from 2 to 20 carbon atoms such as vinyl chloride, vinylidene chloride, trichloroethylene, tetrachloroethylene, trifluorethylene, tetrafluorethylene, vinyl bromide, 1,1,1-trifluoro-2-propene and other similar halogenated olefins; and olefins such as heterocyclic olefins having from 5 to 25 carbon atoms such as vinyl pyridines, vinylimidazole, vinyl furan, furan, pyrrole, and other vinyl substituted heterocyclic olefins. Other unsaturated monomers include vinyl ethers having from 2 to 10 carbon atoms such as methyl vinyl ether, ethyl vinyl ether, phenyl vinyl ether, and other similar vinyl ethers; vinyl esters having from 2 to 10 carbon atoms such as vinyl acetate, methyl or ethyl vinyl acetate, and other similar vinyl acetates; cyano substituted olefins having from 2 to 20 carbon atoms such as acrylonitrile, vinylidene cyanide (1,1-dicyanoethylene), 1,2-dicyanoethylene, tricyanoethylenes, or tetracyanoethylene; $C_1$ to $C_{10}$ acrylics such as acrylic acid, methacrylic acid, acrylamide, methacrylamide, alkylated (meth) acrylate having from 1 to 12 carbon atoms such as methyl methacrylate; vinyl substituted aromatics having from 6 to 24 carbon atoms such as styrene, α-alkylstyrene, such as α-methylstyrene, halogenated styrenes such as fluorostyrenes, chlorostyrenes, bromostyrenes, alkylated styrenes such as methylstyrene, alkoxylated styrene such as methoxy styrene, di-methoxy styrenes, tri-methoxy styrenes, vinyl naphthalenes, substituted vinyl naphthalenes and the like; anhydrides having from 4 to 20 carbon atoms such as succinic anhydride or maleic anhydride, alkylated maleic anhydrides, arylated maleic anhydrides, halogenated maleic anhydrides, maleimide, alkylated maleimide; non-conjugated dienes having from 4 to 20 carbon atoms such as 1,4-hexadiene, 1,4-pentadiene, 1,4-heptadiene, 1,6-hexadiene, and other free-radically polymerizable non-conjugated diene monomers; conjugated dienes such as butadiene, 2,3-dimethylbutadiene, isoprene, piperylene, methyl-substituted piperylenes, and other free-radically polymerizable conjugated diene monomers; cyclic nonconjugated dienes having from 4 to 20 carbon atoms such as 1,5-cyclooctadiene, dicyclopentadiene and other similar cyclic non-conjugated dienes; cyclic conjugated dienes such as cyclopentadiene, 1,3-cyclohexadiene, 1,3-cyclooctadiene, and other similar cyclic conjugated dienes; other olefins such as vinyl terminated or capped polyethers, vinyl capped polythioethers, allyl capped polyisobutylenes, and other similar vinyl or allyl capped polymer or macro monomers; and other free-radically polymerizable, ethylenically unsaturated olefins. Preferred monomers generally include maleic anhydride, styrene, acrylic acid, and methyl methacrylate.

The reaction can be carried out either in a batch reactor or in a continuous reactor. Regardless of the type of reactor being used, it is highly preferred that direct contact of the monomers for any length of time with the flame be avoided, as this would tend to result in oxidation, combustion or decomposition of the monomer. That is, the particles are heated in such a manner as by being continuously moved or in motion in the reaction vessel so that only minute hot spots are created to generate free radicals but generally not hot enough to melt and/or degrade the polymer. If any melting does occur, it only occurs on small portions of the surfaces for a very short period of time. Thus, as a whole, the surfaces of the particles are heated without significantly raising the average or bulk temperature of the solid polymer which serves as a heat sink. That is, the contents of the reactor are preferably maintained at a relatively moderate bulk temperature such as from about 40° C. to about 160° C., and more preferably from about 60° C. to about 90° C., while portions of the polymer surface are at least momentarily heated to relatively high temperatures such as a few hundred degrees celsius by one or more impinging flames. The reaction is generally carried out at moderate or normal pressures within the reaction vessel such as from about 0.1 to about 5 atmospheres and desirably from about 1 to about 2 atmospheres.

The desired rapid heating of the polymer surface without significantly raising the bulk temperature of the polymer, to avoid decomposition thereof, can be achieved, for example, by rapidly moving the polymer through an impinging flame, by using intermittent flame impingement, or by a combination thereof. Most preferably the polymer is in a finely comminuted form and is moved though a narrow flame. The monomer or monomers which are to be grafted to the polymer are preferably introduced into the reactor at either a different time or at a different location from that of the flame to avoid decomposition of the monomers. For instance, in a batch reactor, it is preferred that the polymer be subjected to continuous agitation such as by rotating blades which move the polymer particles past an impinging flame which is provided for a short duration sufficient to cause free-radical generation on the surface of the polymer, and that monomer be introduced into the reactor after the flame has been shut off to allow reaction with the free-radical and hence grafting of the monomer onto the polymer surface. The above steps of flame impingement and monomer introduction can be repeated as needed to achieve a desired degree of graft copolymerization. It is also envisioned that the process can be carried out in a continuous mode wherein the flame impingement and monomer introduction occurs continuously at different positions in the reactor. For example, a continuous fluidized bed reactor wherein flame impingement and monomer introduction occurs in alternating zones is possible.

The monomer or monomers are desirably introduced in either a gaseous or vapor form, or in an atomized liquid form. Because the process of the present invention is normally performed substantially free of or in the absence of both free-radical initiating chemical compounds and irradiation, addition polymerization of ethylenically unsaturated monomers can generally only occur by graft addition onto the free radical sites of the surface of the polymer particles, i.e., essentially all of the monomers which react are grafted to the solid particulate polymer which has been subjected to flame initiation.

The present invention achieves relatively high monomer conversions. That is, the conversion of monomer to grafted chains or polymer is generally from about 2 to about 90 percent, desirably from about 20 to about 85 percent, and preferably from about 40 to about 80 percent based upon the total weight of monomers fed to the reaction vessel. Moreover, the grafting efficiencies of the present invention are generally high. That is, the amount of one or more different classes of monomer grafted onto the polymer is generally at least 2 parts by weight, desirably from about 3 to about 35 parts by weight and preferably from about 4 to about 20 parts by weight based upon 100 parts by weight of the solid polymer particles. Typical reaction times can range from about 10 minutes to about 3 hours.

The process of the present invention is substantially free of any added free-radical initiators. That is, generally less than 1 percent, desirably less than 0.5 percent and preferably less than 100 parts per million by weight, and even nil, that is completely free of free-radical initiators, as in the form of an initial seed, per 100 parts by weight of the total weight of the solid polymer. The present invention is also substantially free or completely free of any added catalysts such that generally less than 1 percent by weight, desirably less than ½ percent by weight, and preferably nil, that is, completely free of, any catalyst based upon 100 parts by weight of the total weight of the solid polymer. The present invention is also substantially free and preferably completely free of various electromagnetic radiation techniques such as ultraviolet radiation, etc. Such irradiation processes typically achieve very low grafting efficiencies, generally less than 1 part by weight of monomers are grafted per 100 parts by weight of the solid polymer particles. Moreover, the polymerization of the present invention is generally conducted substantially free of or completely free of any added solvents such as organic solvents or other liquids. By the term substantially free of it is meant that generally less than 5 percent, desirably less than 2 percent, and preferably less than 1 percent by weight of solvent or other liquid is present per 100 parts by weight of the monomers.

The flame is most preferably introduced to the reactor by thoroughly mixing any type of a combustible gas such as acetylene or alkanes having from 1 to 4 carbon atoms, e.g., methane, ethane, propane, natural gas or the like with a nearly stoichiometric amount of oxygen or air prior to introduction to the reactor to avoid or limit exposure of the solid polymer to oxygen or other chemical species which can react with the free-radicals produced on the surface of the polymer. Preferred combustible gases include acetylene, propane and butane. The proportion of combustible gas to air or oxygen can typically range from a stoichiometric amount of from about a 10 percent deficiency in oxygen to about 50 percent excess oxygen, and more preferably from about 0 to about a 10 percent excess of oxygen to yield complete combustion, i.e., $H_2O$ and $CO_2$. The mixture of combustible gas and air or oxygen preferably enters the reactor through one or more miniature orifices, each having, for example, a diameter of from about 0.1 mm to about 2 mm, and at a pressure sufficiently above the reactor pressure to generate a typical flame length of from about 1 cm to about 5 cm. The diameter of each flame is preferably relatively narrow such as from about 0.1 mm to about 2 mm. The mixture of combustible gas and oxygen or air is preferably electronically ignited at the orifice. To prevent reaction of the polymer with oxygen, and other undesirable side reactions, the reactor contents are preferably maintained in an unreactive or inert environment such as by maintaining the reactor contents under a nitrogen purge or blanket. The polymer can be preheated to the reaction temperature prior to being introduced into the reactor or can be heated by the impinging flame. The monomers may also be preheated if desired.

An important advantage of the present invention is that the average graft chain length can be controlled by merely controlling the amount of flame impingement and monomer addition. In general it is possible to produce shorter graft chains with the methods of the invention than was heretofore possible using conventional free-radical polymerization techniques. More specifically, the graft copolymers of the invention typically have more graft chains per unit area of base polymer, and relatively short graft chains containing from about 1–10, and more preferably from 1–5 monomer repeat units on average, thereby providing graft copolymers having enhanced surface characteristics. That is, the graft copolymer sites are very randomly located on the solid polymer particle surface with the grafts being directed outward, e.g., radially outward, therefrom. The net result is a solid polymer having a surface grafted with a high weight percent of monomers thereon, as noted above. Accordingly, the reactivity and properties of the grafted copolymers are generally maximized.

An apparatus which has been successfully used in the practice of the invention is shown schematically in FIG. 1. The apparatus includes a batch reactor 10 with internal mixers (not shown) which keep the particulate solid polymer in motion to prevent overheating of particular surfaces or particles during flame initiation. The reactor 10 includes a burner 12 and an ignitor 14 for providing a flame which preferably directly impinges upon the polymer particles. An air or oxygen source such as a cylinder 16 is used to supply oxidant to the burner 12 via conduit means 18. A fuel source such as a propane cylinder 20 is used to supply combustible gas to the burner via conduit means 22. The flow of air and fuel is regulated by solenoid valves 24 and 26, respectively, which are opened or closed simultaneously in response to a timer/controller 28. Mass flow controllers 30 and 32 are used to maintain the oxidant and fuel flow rates at preselected values corresponding to the desired fuel to oxidant ratio. The fuel and oxidant streams are combined at mixing point 34 prior to being introduced into the reactor 10 at burner 12. An inert gas source such as a nitrogen cylinder 36 is connected to the reactor 10 by conduit means 38 to prevent oxidation of the polymer or other undesirable reactions. The inert gas flow rate is regulated by mass flow controller 40. The reactor is provided with a vent 42 to prevent pressure from building up in the reactor. The flow of inert gas is preferably maintained at the minimum needed to prevent air infiltration and drive off any uncombusted fuel or excess oxidant. A second timer 44 is used to control an ignitor unit 46 and the electrode 14. The second timer 44 is adjusted to cause a spark or electrical arc at the electrode after the first timer 28 opens valves 24 and 26 to allow flow of a combustible mixture into the burner 12. The delay between the first and second timer is generally just long enough to ensure that a combustible mixture has reached the burner. A three-way valve 48 is used to purge oxidant from supply line 18 as required. The reactor is provided with a thermocouple 50 electrically wired to a temperature controller 52 which controls an electric heating jacket 54 used to heat and maintain the reactor at a desired reaction temperature. Monomer is fed to the reactor through inlet port 56.

The reactor is preferably operated by charging the reactor with a particulate or comminuted polymer onto which monomers are to be grafted. The reactor is then closed, the mixing blades are actuated, the reactor is purged with an inert gas such as nitrogen, and heated to the desired reaction temperature. Thereafter a mixture of combustible gas and oxidant are intermittently introduced to the reactor and ignited to form a plurality of flames which impinge upon the polymer particles as they move past the burner. The flames typically impinge upon the moving polymer particles for a period of from about 1 to about 10 seconds, and are shut off for a period of from about 10 to about 60 seconds. A preselected amount of one or more monomers which are to be grafted onto the polymer are introduced into the reactor during the period of time during which the burners are off. Mixing and purging is preferably continued throughout the process. The polymer is alternately subjected to flame impingement and monomer introduction from between 1 to 6 times/per minute depending upon the desired amount of grafting, the particular polymer and monomers used and the reaction conditions.

The invention can be more fully understood by reference to the following examples which serve to illustrate, but not to limit the scope of the present invention.

EXAMPLE

One hundred seventy five grams of polypropylene particles were added to a twin blade single speed mixer. The mixer was provided with a flexible heating tape. The temperature in the reactor was measured by a T-type thermocouple and it was controlled by a PID temperature controller.

The polymer was flame treated for 15 minutes during which time the temperature rose from room temperature to about 75° C. During this time no heat was supplied from the heating tape. After 15 minutes of flame treatment, 25 ml of purified styrene (inhibitor free) was added and the heat supply to the reactor was started. Initially the temperature dropped to 65° C. and then steadily rose to 130° C. where it was maintained constant for one hour.

At the end of the experiment, the product was continuously extracted for 24 hours with ethyl acetate using Soxhlet extractor. The extracted product was then dried in a vacuum oven for 12 hours at 85° C. at 25 inches Hg. vacuum.

0.2 grams of this product was then dissolved in p-xylene and then cast into a film on a petri-dish. This film was analyzed in a Beckmann FT2100 series FTIR. The peak at 698.4 cm$^{-1}$ (characteristic of monosubstituted aromatic rings) indicates the presence of styrene on the polypropylene backbone.

While in accordance with the patent statutes the best mode and preferred embodiment has been set forth, the scope of the invention is not limited thereto, but rather by the scope of the attached claims.

What is claimed is:

1. A process for grafting a monomer onto a solid polymer particle, comprising the steps of:
   flame heating at at least one localized portion of a surface of the solid polymer particle to a temperature sufficient to form at least one free-radical on the polymer surface without significantly raising the bulk temperature of the polymer,
   contacting said polymer with at least one polymerizable ethylenically unsaturated monomer which will react with said free-radical on the polymer surface, and
   forming at least one grafted chain of said monomer on said solid polymer particle, said process being substantially free of any free radical initiators.

2. A process according to claim 1, wherein said solid polymer is a polyolefin, a poly(vinyl substituted aromatic), a polyacrylamide, a poly(meth) acrylate, a polyacrylonitrile, a polycarbonate, a polydiene, a polyester, a polyimide, a polyvinyl alcohol, a polyvinyl chloride, a polyurethane, or a polyvinyl ester, or combinations thereof, and wherein said monomer is an olefin, a vinyl ether, a vinyl ester, a cyano substituted olefin, an acrylic, a vinyl substituted aromatic, an anhydride, a non-conjugated diene, a conjugated diene, a cyclic non-conjugated diene, a cyclic conjugated diene, or combinations thereof.

3. A process according to 2, including converting from about 2 percent to about 90 percent of said ethylenically unsaturated monomer to said grafted chain on said solid polymer particle.

4. A process according to claim 3, wherein said conversion is from about 40 to about 80 percent, and wherein the average particle size of said solid polymer particle is less than 20 millimeters.

5. A process according to claim 3, wherein said solid polymer particle is high density polyethylene, polypropylene, polyacrylonitrile, or polycarbonate, or combinations thereof and wherein said monomer is styrene, maleic anhydride, acrylic acid, or methyl methacrylate, or combinations thereof, wherein said grafted chain has from 1 to 10 monomer repeat units, and wherein the average size of said solid polymer particle is less than 10 millimeters.

6. A process according to claim 1, wherein said process is carried out substantially free of irradiation, and substantially free of one or more solvents.

7. A graft copolymer, comprising:
   the reaction product of a solid polymer particle having free-radicals thereon generated by a flame and being substantially free of any free radical initiators,. with at least one monomer, said solid polymer particle having a grafted chain of said monomer substantially on the surface of said polymer.

8. A graft copolymer according to claim 7, wherein said monomer is an ethylenically unsaturated monomer.

9. A graft copolymer according to claim 8, said solid polymer is a polyolefin, a poly(vinyl substituted aromatic) a polyacrylamide, a poly(meth) acrylate, a polyacrylonitrile, a polycarbonate, a polydiene, a polyester, a polyimide, a polyvinyl alcohol, a polyvinylidene chloride, a polyurethane, a polyvinyl ester or combinations thereof, and wherein said monomer is an olefin, a vinyl ether, a vinyl ester, a cyano substituted olefin, an acrylic, a vinyl substituted aromatic, an anhydride, a non-conjugated diene, a conjugated diene, a cyclic non-conjugated diene, a cyclic conjugated diene, or combinations thereof.

10. A graft copolymer according to claim 9, wherein said solid polymer particle has an average size of less than 20 millimeters.

11. A graft copolymer according to claim 10, wherein said solid polymer particle has an average size of less than 5 millimeters, wherein said solid polymer particle is high density polyethylene, polypropylene, polyacrylonitrile, or polycarbonate, or combinations thereof, wherein said grafted chain has from 1 to 10 monomer repeat units, and wherein said monomer is styrene, maleic anhydride, acrylic acid, or methyl methacrylate, or combinations thereof.

12. A graft copolymer according to claim 9, wherein said solid polymer particle is high density polyethylene, polypropylene, polyacrylonitrile or polycarbonate, or combinations thereof, and wherein said monomer is styrene, maleic anhydride, acrylic acid or methyl methacrylate, or combinations thereof.

13. A graft copolymer according to claim 12, wherein the amount of said grafted chain is from about 4 to about 20 parts by weight per 100 parts by weight of said solid polymer particle.

14. A graft copolymer according to claim 7, wherein the amount of said grafted chain is from about 3 to about 35 parts by weight per 100 parts by weight of said solid polymer particle.

\* \* \* \* \*